Sept. 29, 1931.  J. SCIALLIS  1,825,607
EXTENSION FORMER
Filed June 27, 1930
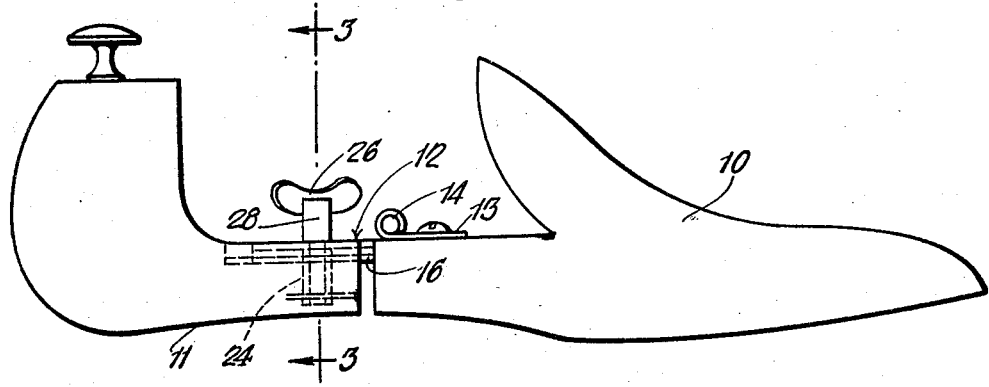
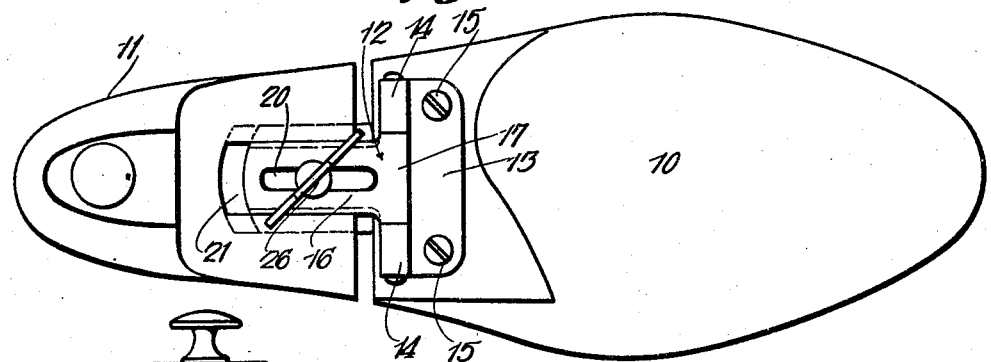
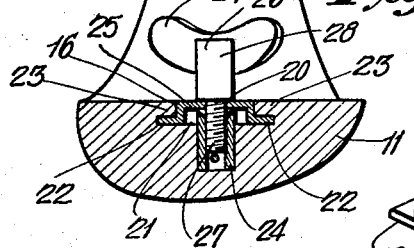
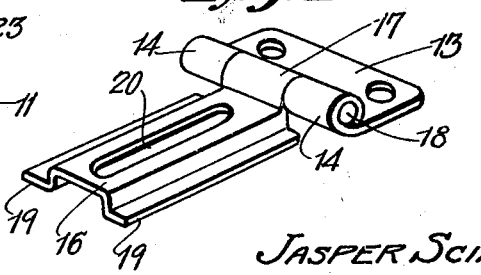
Inventor
JASPER SCIALLIS.
By *Clarence A. O'Brien*
Attorney Patented Sept. 29, 1931

1,825,607

UNITED STATES PATENT OFFICE

JASPER SCIALLIS, OF STATEN ISLAND, NEW YORK

EXTENSION FORMER

Application filed June 27, 1930. Serial No. 464,340.

This invention relates to improvements in extension hinges, and has particular reference to an extensible hinge for connecting the heel and toe sections of a shoe tree to facilitate the adjustment of the tree to fit different size shoes.

It is appreciated that extensible hinges have heretofore been associated with shoe trees, but some difficulty has been experienced in providing a hinge in which the two tree sections may be adjusted without necessitating care in alining the sections after an adjustment has been made. In this invention the tree sections always remain in proper alinement which facilitates the quick and easy adjustment of the heel and toe sections of the shoe tree.

Another object of the invention is to provide an extensible hinge for shoe trees which is fixedly connected to one of the tree sections and includes a shank adapted to be slidably received in a recess provided in the other tree section, and clamping means associated with the shank and tree section for securing the hinge in various adjusted positions.

With these and other objects in view, the invention resides in certain novel construction, combination, and arrangement of parts, the essential features of which are hereinafter described, are particularly pointed out in the appended claims, and are illustrated in the accompanying drawings, in which:

Figure 1 is a side elevational view showing a shoe tree equipped with my improved extension hinge.

Figure 2 is a top plan view of the same.

Figure 3 is a vertical transverse sectional view on the line 3—3 of Figure 1.

Figure 4 is a detail perspective view of the hinge per se.

Referring to the drawings by reference character 10 designates the toe section of a shoe tree, and 11 the heel section, while connecting the adjacent ends of the sections 10 and 11 is my improved extension hinge 12. The hinge 12 embodies a leaf section 13 provided with spaced hinge knuckles 14 and which leaf section is fixedly secured to the rear end of the toe section 10 by screws or like fastening elements 15.

Associated with the leaf section 13 is a shank section 16, one end of which terminates in a knuckle 17 which fits between the spaced knuckles 14—14 of the leaf sections and is disposed in alinement with the knuckles 14 to receive a pivot pin 18, whereby the two sections 13 and 16 are pivotally or hingedly connected together.

The shank section 16 is constructed of a flat material having its longitudinal side edges bent downwardly and thence outwardly to provide outwardly extending parallel flanges 19—19, the said flanges being disposed below the plane of the major portion of the shank. The shank 16 is provided with an elongated slot 20 for a purpose to be presently explained.

Extending inwardly from the front end of the tree section 11 is a recess 21, the side walls of which are grooved or channeled as at 22 to provide overhanging flanges 23, while secured in the said tree section and extending into the recess 21 is an internally screw threaded sleeve or ferrule 24, the upwardly extending end being flared or beveled inwardly as at 25. The channels 22 receive the outwardly extending flanges 19—19 on the shank 16 by inserting the said shank into the recess through the open ends thereof, and when the shank is so positioned, the tree sections cannot be swung with respect to each other, nor can they be lifted relative to each other. However, they may be moved longitudinally to facilitate adjustment of the heel and toe sections of the tree to fit various size shoes. For the purpose of securing the tree sections in an adjusted position, I provide suitable clamping means which comprises a clamping screw 26 provided with a threaded shank 27 of a size to pass through the elongated slot 20 in the shank and thread into the internally threaded collar 24. The outer end of the shank 27 terminates in a clamping head 28 from which manipulating portions or wings 29 extend for facilitating the turning of the screw. It will be understood that when the screw 26 is turned in one direction, the under side of the head 28 will bear against the top of the shank 16 and thus clamp the hinge in an adjusted position. By turning the screw in an opposite direction, the same will be loosened to facilitate the longitudinal adjustment of the tree section. By providing the top of the sleeve 24 with a beveled head, the same serves to guide the free end of the threaded shank of the screw into the collar when threadedly connecting the parts together.

From the foregoing description it will be seen that I have provided an improved extensible hinge in which the toe and heel sections of the shoe tree are maintained in proper alinement as there is no possibility of the same becoming out of alinement during the adjustment of the hinge. This permits an easy and accurate adjustment at all times.

Having thus described the invention, what I claim as new and desire to secure by Letters Patent is:—

1. In a shoe tree constructed of two sections, an extensible hinge comprising a leaf plate secured to one of the tree sections, a shank pivoted to said leaf plate and slidable in a recess provided with the other of said tree sections, and clamping means for securing said shank in an adjusted position within said recess, said means including a clamping screw passing through an elongated slot in said shank and being threaded into a threaded socket in the bottom wall of said recess.

2. In a shoe tree constructed of two sections, one of said sections having a recess provided with under cut channels in its side walls, an extensible hinge comprising a leaf plate secured to one of said sections, a shank pivoted to said leaf plate and provided with outwardly extending flanges, said shank being slidable in said recess with the flanges disposed in said undercut channels, and screw clamping means for securing said shank in an adjusted position within said recess.

3. In a shoe tree constructed of two sections, one of said sections having a recess provided with channels in its side walls, an extensible hinge comprising a leaf plate secured to one of said sections, a shank pivoted to said leaf plate and provided with outwardly extending flanges, said shank being slidable in said recess with the flanges disposed in said channel, clamping means for securing said shank in an adjusted position within said recess, said clamping means including an internally threaded sleeve secured to the recessed tree section and extending above the plane of the bottom wall of said recess, and a clamping screw passing through an elongated slot provided in said shank and threaded into said sleeve, the screw being provided with a head in clamping engagement with the top of said shank.

4. In a shoe tree constructed of a toe section and a heel section, said heel section having a longitudinal recess in the top which opens through the inner ends thereof, an extension hinge comprising a leaf plate secured to the inner end of said toe section, a flat shank pivoted to said leaf plate and slidable in said recess, said shank having an elongated slot therein, a threaded socket provided in the bottom wall of said recess intermediate the ends thereof, and a headed clamping screw freely passing through said slot and threadedly connected in said threaded socket with the head of the headed screw in clamping engagement with the top of said flat shank.

In testimony whereof I affix my signature.

JASPER SCIALLIS.